United States Patent Office 3,027,350
Patented Mar. 27, 1962

3,027,350
STABILIZED VINYL CHLORIDE RESIN
Gerry P. Mack, Jackson Heights, and Emery Parker, New York, N.Y., assignors, by mesne assignments, to Carlisle Chemical Works, Inc., Reading, Ohio, a corporation of Ohio
No Drawing. Original application Jan. 2, 1953, Ser. No. 329,481. Divided and this application July 3, 1959, Ser. No. 824,789
6 Claims. (Cl. 260—45.75)

The invention relates to stabilized halogen-containing resins and compositions containing the same.

It is well known that halogen-containing resins, particularly vinyl chloride resins and resins formed by conjoint polymerization of vinyl chloride with vinyl acetate or other unsaturated compounds polymerizable therewith, are liable to discoloration when subjected to elevated temperatures during or after compounding and also under the influence of prolonged exposure to light.

Among the stabilizers proposed to prevent said discoloration, tin in the form of various organo-tin compounds has proved effective. In these compounds, the $R_2Sn=$ or $R_3Sn-$ group is linked to organic groups which influence the physical and chemical properties of the stabilizer and have generally the function to render the compound compatible with the resins to be stabilized, but which, as a rule, do not contribute of themselves to the stabilizing effect proper.

We have found a new group of organo-tin compounds, in which the stabilizing properties inherent in the organo-tin radical are considerably enhanced by the specific organic group attached to the tin atom.

This new class of stabilizers consists of organo-tin compounds in which the radical of a mercapto compound having two reactive hydrogen atoms, of which the one is the hydrogen of the sulfhydryl group and the other the hydrogen of a free carboxyl group, is linked with the S atom of the sulfhydryl as well as with the oxygen atom of the carboxyl group directly to tin atoms.

The compounds may be prepared by reacting 1 mole of a diorgano-tin dihalide, oxide, or dialkoxide with a mercapto acid whereby, for instance, compounds of the character

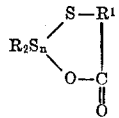

are obtained, wherein $R^1$ is the nucleus of the mercapto acid.

R in the formula is a monovalent hydrocarbon radical, for instance, an aliphatic, aromatic or alicyclic group, such as methyl, ethyl, propyl, butyl, amyl, hexyl, octyl, lauryl, allyl, benzyl, phenyl, tolyl, cyclohexyl. The nature of these groups has in most cases no, or only a very minor, influence on the properties of the end products. The two R groups will be generally the same radicals but may be different.

The organotin mercapto compounds of the character described have a stabilizing action on halogen-containing resins which is superior to the organo-tin compounds used heretofore for this purpose. They are effective up to relatively very high temperatures and can be employed for conventional resin mixes as well as for plastisols and organosols.

Instead of using a monomeric organotin compound, one mole of a polymeric organotin alkoxide or a linear hydrocarbon substituted polystannanediol monoester or ether ester may be reacted with one mole of the mercapto acid. The thus obtained polymeric mercapto compounds have the advantage of combining good compatibility with low vapor pressure.

If a diorganotin halide is used as starting material, preferably the sodium salt of the mercapto acid is used for the reaction.

We use the novel organo-tin mercapto compounds in amounts of 0.1 to 10 percent, preferably 0.5 to 5 percent by weight of the organo-tin compound on the weight of the halogen-containing resin. They may be used alone or in mixture with other metallic or non-metallic stabilizers, such as salts of barium, strontium, calcium, zinc, tin, and of other metals which do not form colored sulfides.

Among the non-metallic stabilizers, particularly compounds having one or more epoxy groups in the molecule are of great value. But also compounds having generally recognized anti-oxidant properties such as substituted phenols, tri-esters of phosphorous acid, and the like, can be employed. The new stabilizers are compatible with most of the conventional plasticizers and are of particular utility in combination with plasticizers which may reduce the stability of halogen-containing resins.

Halogen-containing resins, which are made heat and light resistant by the stabilizers of this invention, include polymers of vinyl chloride and vinyl resins containing vinyl chloride units in their structure, such as copolymers of vinyl chloride with vinyl esters of aliphatic acids, particularly vinyl acetate; copolymers of vinyl chloride with esters of acrylic and methacrylic acids, and with acrylonitrile; copolymers of vinyl chloride with diene compounds and unsaturated dicarboxylic acids or their anhydrides, such as copolymers of vinyl chloride with diethyl maleate, diethyl fumarate or maleic anhydride; after-chlorinated polymers and copolymers of vinyl chloride; copolymers of vinyl chloride and vinylidene chloride with unsaturated aldehydes, ketones and others, such as acrolein, croton aldehyde, vinyl methyl ketone, vinyl methyl ether, vinyl isobutyl ether, and the like; polymers of vinylidene chloride and copolymers of the same with vinyl chloride and other polymerizable compounds; polymers of vinyl chloroacetate and dichlordivinyl ether; chlorinated polymers of vinyl acetate; chlorinated polymeric esters of acrylic and alpha-substituted acrylic acids; polymers of chlorinated styrenes, for instance dichlorostyrene; chlorinated rubber; chlorinated polymers of ethylene; polymers and after-chlorinated polymers of chlorobutadienes, and their copolymers with vinyl chloride; rubber hydrochloride and chlorinated rubber hydrochloride; and mixtures of the polymers recited herein with each other or other polymerizable compounds. The corresponding bromides and fluorides are equally well stabilized.

The following examples will serve to illustrate the invention. It is to be understood that these examples are not to be considered as limiting the scope of the invention, which is defined by the claims, and that a stabilizer given in one example for a particular resin may be used for the resins of the other examples, and vice versa.

*Example 1*

.05 moles=24 grams of dilauryl tin oxide and .05 mole of thiosalicyclic acid were refluxed in toluol until a clear solution was obtained and .05 mole of water separated. The toluol was then removed under reduced pressure and a soft waxy product was obtained in nearly theoretical yield. The reaction product had a molecular weight of 609.4 and a tin content of 18.7% (theoretical tin content 19.46%) and corresponded to the formula:

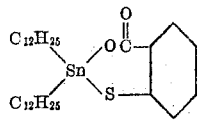

*Example 2*

.2 mole of diphenyl tin dimethoxide and .2 mole of beta mercapto propionic acid were refluxed in toluol and the toluol-methanol azeotrope continuously replaced with toluol until no more methanol could be detected in the distillate. The product obtained, which was insoluble in toluol, was filtered, washed, and dried. It had a molecular weight of 377.0 and the formula:

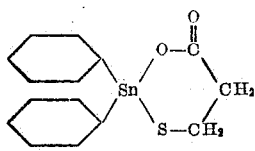

Tin content=30.7% (theoretical content 31.5%)
Melting point=220° to 225° C. (dec.)

The compounds prepared according to Examples 1 and 2 were tested as stabilizers by incorporating 1 to 2 g. in 50 g. of a plasticizer and adding the mixture to 100 g. of vinyl chloride-vinyl acetate copolymer in the manner described in Example 3 of Patent No. 2,914,506. On heating stabilized films from this mixture in the same way as set forth in said example, the films remained colorless for at least 60 min.

This application is a division of our application Serial No. 329,481, filed Jan. 2, 1953, for "Halogen-Containing Resins Stabilized With Organo-Tin Mercapto Compounds," now Patent No. 2,914,506.

We claim:

1. A heat and light resistant plastic composition, including as a major constituent a vinyl chloride containing resin and as a stabilizer an organotin mercapto compound in which a tin atom is linked with one valence each to a monovalent hydrocarbon radical, the two remaining valences being linked to the sulfur atom of the sulfhydryl group and to the oxygen atom of the carboxyl group of a mercapto acid.

2. A heat and light resistant plastic composition as defined in claim wherein the resin is a conjoint polymer of vinyl chloride with another polymerizable compound.

3. A heat and light resistant plastic composition, including as a major constituent a vinyl chloride containing resin and as a stabilizer an organotin mercapto compound of the general formula

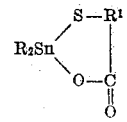

wherein R is a monovalent hydrocarbon radical and $R^1$ is the nucleus of a mercapto acid.

4. A heat and light resistant plastic composition, including as a major constituent a vinyl chloride containing resin and as a stabilizer the compound

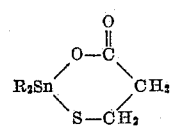

wherein R is a monovalent hydrocarbon radical.

5. A heat and light resistant plastic composition, including as a major constituent a vinyl chloride containing resin and as a stabilizer the compound

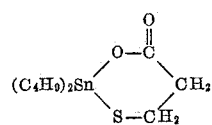

6. A heat and light resistant plastic composition, including as a major constituent a vinyl chloride containing resin and as a stabilizer the reaction product of one mole of an organotin compound selected from the group consisting of diorganotin halides, monomeric and polymeric organotin ethers and ether esters, and organotin oxides, with one mole of a mercapto acid.

References Cited in the file of this patent
UNITED STATES PATENTS
2,789,963     Hecker _____ Apr. 23, 1957